United States Patent [19]
Martin

[11] 3,966,284
[45] June 29, 1976

[54] SNAPPABLE OPEN SEPARATORS FOR THE CAGE OF ROLLING THRUST BEARING ELEMENTS

[75] Inventor: Jacques Lucien Joseph Martin, Paris, France

[73] Assignee: R.K.S. Societe Anonyme, France

[22] Filed: Mar. 19, 1974

[21] Appl. No.: 452,567

[30] Foreign Application Priority Data
Mar. 20, 1973  France .............................. 73.09979

[52] U.S. Cl. ............................................... 308/235
[51] Int. Cl.² ......................................... F16C 19/20
[58] Field of Search ........... 308/201, 235, 236, 217, 308/218, 219; 29/148.4 C

[56] References Cited
UNITED STATES PATENTS

| | | | |
|---|---|---|---|
| 821,882 | 5/1906 | Perkins | 208/217 |
| 1,258,002 | 3/1918 | Hart | 308/212 |
| 1,320,373 | 11/1919 | Bock | 29/148.4 C |
| 1,966,266 | 7/1934 | Skelly | 308/217 |
| 2,417,559 | 3/1947 | Larson | 308/217 |
| 3,588,207 | 6/1971 | Greby | 308/217 |
| 3,704,919 | 12/1972 | Titt | 308/217 |

*Primary Examiner*—Philip Goodman
*Assistant Examiner*—Richard A. Bertsch
*Attorney, Agent, or Firm*—Stevens, Davis, Miller & Mosher

[57] ABSTRACT

Snappable separators adapted to be connected together by means of a ring in order to form a cage for rolling bearing elements.

Cylindrical nesting surfaces — one convex 9 and one concave 10 — are intended to produce the contacts between adjacent separators on the side on which the axis of the cage of the bearing is located.

An assembling ring 8 surrounds all of the separators at the periphery of the cage which is thus formed.

12 Claims, 9 Drawing Figures

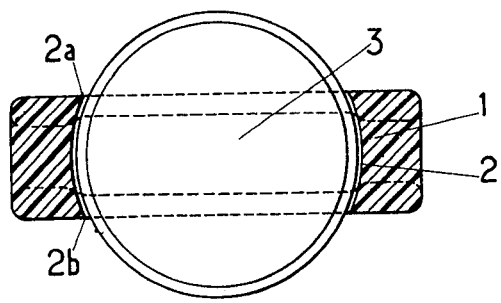
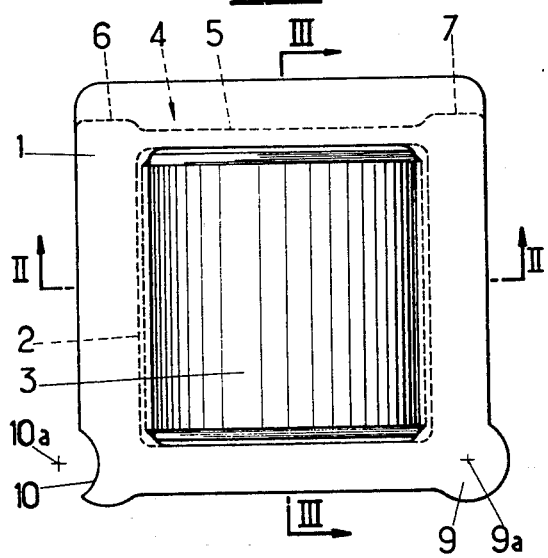
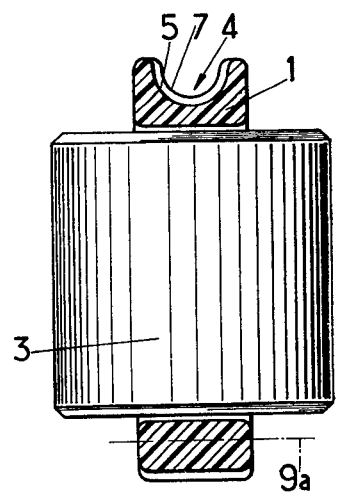
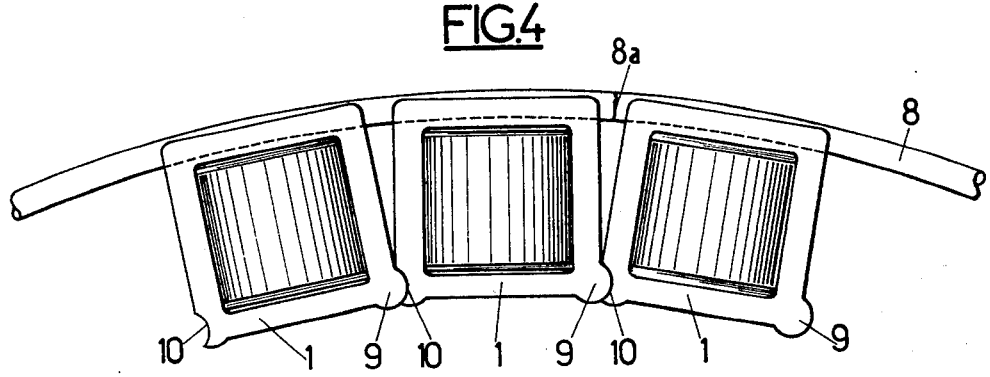

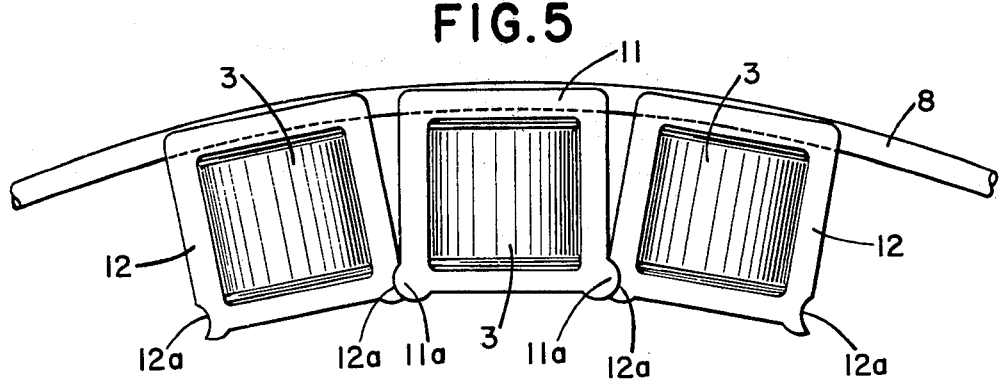
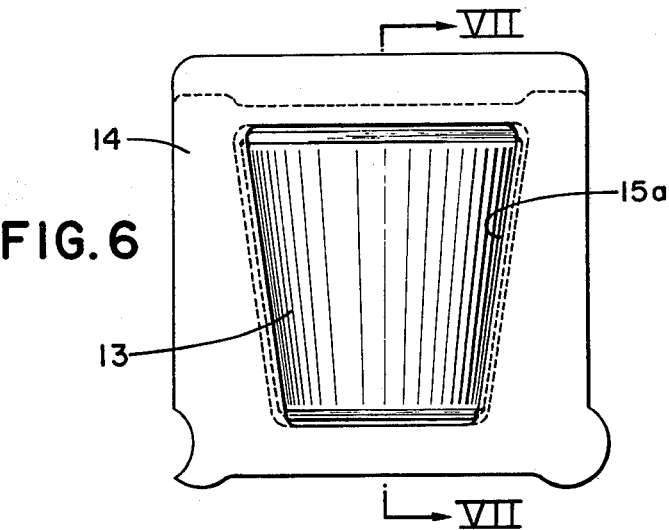
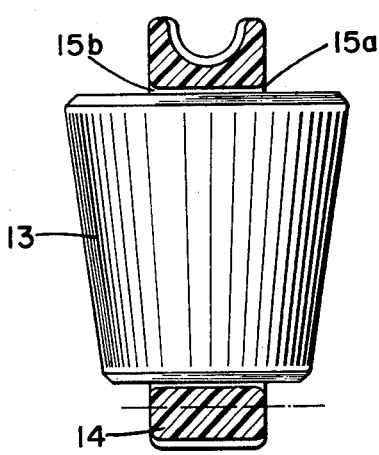
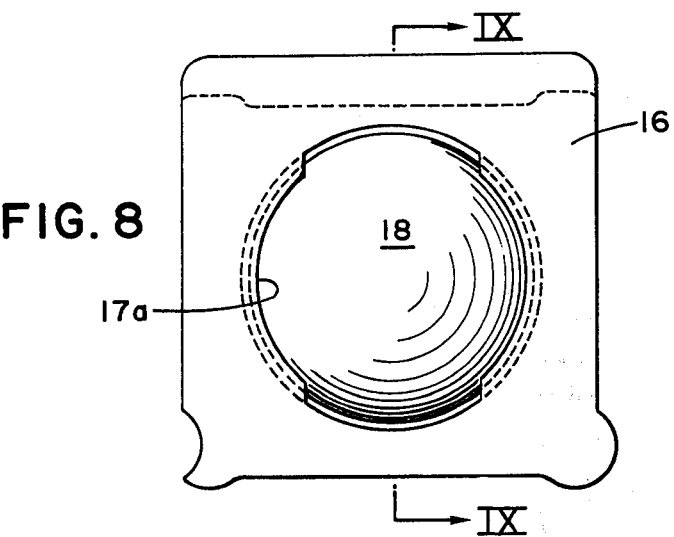
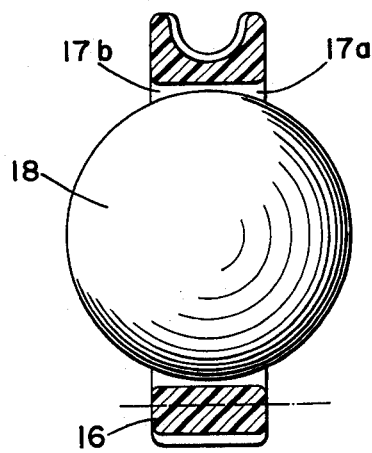

SNAPPABLE OPEN SEPARATORS FOR THE CAGE OF ROLLING THRUST BEARING ELEMENTS

The present invention relates to open separators which, by being assembled together, can form a cage for the rolling elements of a thrust bearing, which separators can be used to produce thrust bearings of different diameters are constituted of identical rolling elements.

Open separators for cages of roller thrust bearings are already known and have asymmetrical side surfaces of generally cylindrical shape, one concave and one convex, these surfaces being adapted to cooperate respectively with corresponding cylindrical surfaces of adjacent separators so as to form a roller cage for rolling-contact thrust bearings.

While contact over a substantial area is actually obtained in this case for a given diameter of the raceways between the fitting surfaces between adjacent separators, this contact, on the other hand, becomes linear for different diameters. Now, such linear contacts have the drawback of causing wear of the separators and increasing the play between them, thus permitting harmful relative movements between the said adjacent separators.

The snappable open separators in accordance with the invention make it possible to avoid all these drawbacks. Whatever the diameter of the thrust bearing produced, every two successive separators always have an appreciable surface of common contact. This result is obtained in accordance with the invention, as well as the holding fast of the said open separators with respect to each other, by providing on these separators, on the side facing the axis of the thrust bearing, convex or concave cylindrical surfaces adapted to permit cooperation between adjacent cylindrical surfaces provided on contiguous elements, and by furthermore providing on the opposite side a groove intended to cooperate with an assembling ring housed in a median plane of the cage formed by the said separators and said ring, which plane is perpendicular to the axis of the said bearing. The separators may also have bosses intended to cooperate with the groove of an assembling ring located in a median plane of the cage. The said cylindrical surfaces are of small radius as compared with the dimensions of the said separators, and their axis is parallel to the axis of said cage. A single type of separator having a convex cylindrical boss and, on the opposite side, a concave cylindrical recess of the same radius is preferably employed.

The snappable open separators in accordance with the invention may be contemplated as desired for cylindrical or tapered rollers or for balls. These cylindrical or tapered rollers or balls are housed in the said separators within suitable recesses into which they are introduced preferably by force by utilizing the elasticity of the plastic material forming said separators.

In another embodiment of the separator in accordance with the invention, the axes of the two cylindrical contact surfaces of the said separator are symmetrical with respect to the transverse plane of symmetry of said groove, which makes it possible, when cylindrical rollers are used, to orient them accurately towards the axis of the bearing.

The invention also relates to a cage for rolling elements which is composed of separators in accordance with the invention assembled together on the one hand by a ring passing through all the grooves of the said separators and on the other hand by the embedding or snapping into position of the said cylindrical surfaces.

The separators may be made of any material having a certain plasticity, while the aforementioned ring may be flexible or rigid.

In order that the object of the invention may be better understood, one illustrative embodiment shown in the accompanying drawing will be described by way of illustration and not of limitation. In the drawing:

FIG. 1 is a plan view of a snap-action open separator in accordance with the invention, containing a cylindrical roller;

FIG. 2 is a bottom view in cross section of the said separator, along the line II—II of FIG. 1;

FIG. 3 is a side view in cross section of the same separator, along the line III—III of FIG. 1;

FIG. 4 is a plan view of a portion of a thrust-bearing case with cylindrical rollers in accordance with the invention;

FIG. 5 is a plan view of a portion of a thrust-bearing case with cylindrical rollers in accordance with another embodiment of the invention;

FIG. 6 is a plan view of another embodiment of a snap-action open separator in accordance with the invention, containing a tapered roller;

FIG. 7 is a side view in cross-section of the separator of FIG. 6, along the line VII—VII;

FIG. 8 is a plan view of another embodiment of a snap-action open separator in accordance with the invention, containing a ball roller; and FIG. 9 is a side view in cross section of the separator of FIG. 8, along the line IX—IX.

The separator 1 is of substantially rectangular shape. A recess 2 of cylindrical shape retains a cylindrical roller 3 introduced by force through one of the openings 2a and 2b which have a width less than the diameter of the said roller.

At the upper part of the separator 1 there is a semi-cylindrical groove 4 whose diameter is increased in its central portion 5. The cylindrical portions 6 and 7 are intended to cooperate with the said assembling ring of circular cross section, shown at 8 in FIG. 4.

Near one of the lower corners of the separator 1 there is a convex cylindrical portion 9 of small radius, having the axis 9a. Near the opposite lower corner, a concave cylindrical recess is visible at 10 in FIGS. 1 and 4. This recess is of the same radius as the convex cylindrical portion 9 and has its axis 10a parallel to the said axis 9a.

FIG. 4 shows three snap-action open separators 1 constituting a portion of a bearing cage for cylindrical rollers. The separators 1 are nested in each other at the cylindrical surfaces 9 and 10, but upon the assemblying between the ring 8 and the different separators at their respective grooves, it is necessary, in order to mount the last separator of the cage to insert it forcefully by snap action between a cylindrical boss and a cylindrical recess belonging respectively to the two contiguous separators.

In the embodiment illustrated in FIG. 4 of the drawing, the ring 8 is formed of a rod of plastic material, the two ends of which are connected by welding at 8a.

Of course, various changes, improvements or additions can be made in the embodiment which has just been described or certain elements replaced by equivalent elements without thereby going beyond the scope of the invention.

In particular, one can alternate two different types of separators, one provided with two cylindrical bosses and the other with two recesses of the same shape. This is shown in FIG. 5 in which the cylindrical rollers 3 are retained in separators 11 and 12 which have, respectively, two cylindrical bosses 11a and two cylindrical receses 12a.

In another embodiment, as shown in FIGS. 6 and 7, a tapered roller 13 may be retained in a separator 14 having cylindrical tapered openings 15a and 15b. Also, as shown in FIGS. 8 and 9 the invention includes a separator 16 having circular openings 17a and 17b to retain a ball roller 18.

What is claimed is:

1. An apparatus, housing a rolling thrust-bearing element, for use with other apparatuses of the same type housing other thrust-bearing elements, which apparatuses are assembled together with a ring to form a cage, having an axis, for the elements, said apparatus housing a roller thrust-bearing element comprising: a separator including an opening in which the element is located, a first side having a groove which cooperates with the ring, and a second side opposite said first side and for facing the axis of the cage, said second side including first and second cylindrical surfaces having the same radius and axes parallel to the axis of the cage, said first and second surfaces being located, respectively, in the vicinity of the ends of said second side, whereby one separator may nest with adjacent separators by the cooperation of said first and second surfaces on the one separator with complementary surfaces on adjacent separators.

2. Apparatus according to claim 1 wherein the axes of said first and second surfaces are symmetrical with respect to a plane of symmetry of said opening passing through the axis of said thrust-bearing element.

3. Apparatus according to claim 2, wherein the transverse dimension of said opening is less than the diameter of the thrust-bearing element, and said separator includes a material of sufficient plasticity to permit the thrust-bearing element to be force fit into said opening.

4. An apparatus, housing a rolling thrust-bearing element, for use with other apparatuses of the same type housing other thrust-bearing elements, which apparatuses are assembled together with a ring to form a cage, having an axis, for the elements, said apparatus housing a roller thrust-bearing element comprising: a separator including an opening in which the element is located, a first side having a boss which cooperates with the ring, and a second side opposite said first side and for facing the axis of the cage, said second side including first and second cylindrical surfaces having the same radius and axes parallel to the axis of the cage, said first and second surfaces being located, respectively, in the vicinity of the ends of said second side, whereby one separator may nest with adjacent separators by the cooperation of said first and second surfaces on the one separator with complementary surfaces on adjacent separators.

5. A thrust-bearing cage having an axis, comprising:
a. a plurality of rolling thrust-bearing elements;
b. a plurality of separators adjacent one another, each including an opening in which one of said plurality of elements is located, a first outer side having a groove, and a second inner side opposite said first side and facing the axis of the cage, said second side including a first cylindrical surface and a second cylindrical surface, said first and second surfaces having the same radius and axes parallel to the axis of the cage, said first and second surfaces being located, respectively, in the vicinity of the ends of said second side, wherein said first and second surfaces of one of said separators nest with adjacent separators having surfaces complementary to said first and second surfaces, and wherein said thrust-bearing elements have a diameter greater than the transverse dimensions of the openings and said separators include a material of sufficient plasticity to permit said thrust-bearing elements to be force fit into the openings; and
c. a ring, connected to each groove of said separators, to hold said separators radially at the outer sides of said separators.

6. A thrust-bearing cage according to claim 5 wherein said separators are of two different types, one type of said separators including first and second surfaces which are bosses, the other type of said separators including first and second surfaces which are recesses, said one type of said separators being alternately located with respect to said other type of said separators.

7. A thrust-bearing cage according to claim 5 wherein said separators are of one and the same type, said first surface of said separators being a boss and said second surface of said separators being a recess.

8. A thrust-bearing cage according to claim 5 wherein said thrust-bearing elements are cylindrical.

9. A thrust-bearing cage according to claim 5 wherein said thrust-bearing elements are tapered rollers.

10. A thrust-bearing cage according to claim 5 wherein said thrust-bearing elements are balls.

11. A thrust-bearing cage comprising:
a. a plurality of rolling thrust bearing elements;
b. a plurality of separators, adjacent to one another, having openings therein for said thrust bearing elements, said separators having grooves at their outer sides and at their inner sides cylindrical surfaces which are bosses and recesses to enable adjacent separators to nest by said bosses and recesses; and
c. a single ring to hold said separators, said single ring connected within said grooves and holding said separators radially at the outer sides of separators.

12. A method of manufacturing a thrust-bearing cage including a plurality of separators, adjacent to one another, having openings therein for rolling thrust-bearing elements and cylindrical surfaces, at the inner sides of said separators, which are bosses and recesses to enable adjacent separators to nest by said bosses and recesses, and a single ring to hold said separators, the single ring holding the separators radially at the outer sides of said separators, comprising:
a. first placing all but one of said separators onto said ring; and
b. then snapping the cylindrical surfaces of the last separator between the cylindrical surfaces of two adjacent separators to cause said last separator to cooperate with the single ring.

* * * * *